(12) United States Patent
Krupa, Jr.

(10) Patent No.: US 7,314,536 B2
(45) Date of Patent: Jan. 1, 2008

(54) DISC PAIRING IN OPTICAL DISC REPLICATION

(75) Inventor: Leonard Krupa, Jr., Terre Haute, IN (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 463 days.

(21) Appl. No.: 10/964,913

(22) Filed: Oct. 14, 2004

(65) Prior Publication Data

US 2006/0083891 A1    Apr. 20, 2006

(51) Int. Cl.
*B29C 65/00* (2006.01)
(52) U.S. Cl. ............... 156/285; 156/275.5; 156/275.7; 156/286; 156/381; 156/382
(58) Field of Classification Search ............... 156/104, 156/275.5, 275.7, 285, 286, 295, 381, 382
See application file for complete search history.

(56) References Cited

U.S. PATENT DOCUMENTS

| | | | |
|---|---|---|---|
| 5,284,538 A | 2/1994 | Suzuki et al. | |
| 5,318,653 A | 6/1994 | Toide et al. | |
| 5,378,517 A | 1/1995 | Suzuki et al. | |
| 5,766,407 A * | 6/1998 | Miwa et al. | 156/382 |
| 5,779,855 A | 7/1998 | Amo et al. | |
| 5,789,053 A | 8/1998 | Asai | |
| 5,824,385 A | 10/1998 | Itoigawa et al. | |
| 5,961,777 A | 10/1999 | Kakinuma | |
| 6,136,133 A | 10/2000 | Maruyama et al. | |
| 6,254,716 B1 * | 7/2001 | Russell et al. | 156/286 |
| 6,402,880 B1 * | 6/2002 | Ewerlof et al. | 156/295 |
| 2002/0053397 A1 * | 5/2002 | Ebisawa et al. | 156/275.5 |

* cited by examiner

*Primary Examiner*—John L Goff
(74) *Attorney, Agent, or Firm*—Miller Patent Services; Jerry A. Miller

(57) ABSTRACT

In a pairing arrangement, a first half-disc and a second half-disc of an optical disc are bonded together by dispensing a bonding material onto the second half-disc and the first half-disc and second half-disc are placed in a chamber. The pressure within the chamber is reduced to a pressure below an ambient pressure and the first half-disc and the second half-disc are brought together within the chamber to distribute the bonding material between a surface of the second half-disc and a corresponding surface of the first half-disc and thereby form a paired disc. This abstract is not to be considered limiting, since other embodiments may deviate from the features described in this abstract.

11 Claims, 6 Drawing Sheets

DISC PAIRING IN OPTICAL DISC REPLICATION

BACKGROUND

At one stage in the replication of optical discs such as DVDs (Digital Versatile Discs, also referred to as Digital Video Discs), two clear polycarbonate half-discs are bonded together, for example using an ultraviolet curable resin, to form the assembled disc. The bonding of the two half-discs is referred to as the Pairing Process. Prior to bonding, the surface of at least one of the half-discs is coated with a reflective layer of aluminum to enable the disc to reflect laser light in a DVD player. Similar techniques are used for other types of optical discs.

In a Pairing Process, ultraviolet curable resin is deposited on one of the half-discs and then the two half-discs are brought together with their mating surfaces at an acute angle to each other. The angle between the half-discs is then decreased so that the ultraviolet curable resin is distributed across the mating surfaces of the half-discs.

One disadvantage of this approach is the high complexity of the control system that controls the motion of the half-discs. The motion is typically specified in advance using a large number of parameters. The high complexity of the motion control machinery increases the time spent maintaining and repairing equipment.

A further disadvantage of this approach is that air bubbles can be trapped between the mated surfaces of the half-discs. These bubbles reflect laser light and can cause the disc to be rejected. This, in turn, reduces the yield of the replication process. The number of bubbles can be reduced by applying the ultraviolet curable resin and paring the half-discs in an evacuated enclosure. However, a large enclosure is required to accommodate all of the equipment. The time spent removing air from the large enclosure and moving half-disc in and out of the chamber results in a relatively slow process. The process is further complicated by the need to apply the ultraviolet curable resin into the vacuum.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
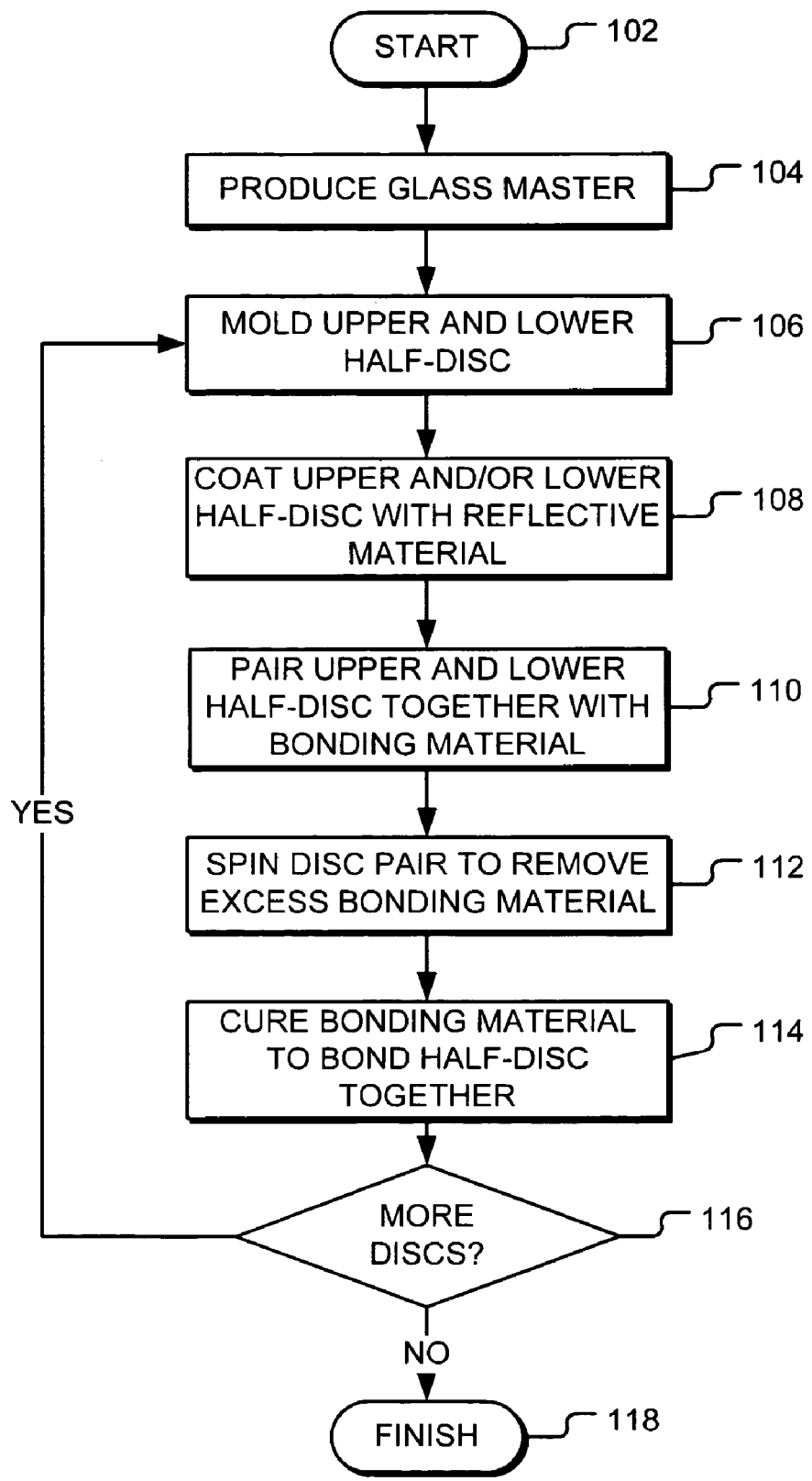
FIG. 1 is a flow chart of a method consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "upper" and "lower" as used herein are to be considered relative terms for an exemplary embodiment and should not be considered limiting. For example, in certain embodiments, the lower element could be configured to be above the upper element, or equivalent structures could be constructed side by side, so that the "upper" element as described herein is actually physically located to the side of the "lower" element. In the exemplary embodiment, of course, the upper element is above the lower element, and the current description and claims use such terms to describe them as such for ease of illustration. However, the invention should not be considered limited by the conventional meaning of these terms.

One aspect of certain embodiments consistent with the present invention relates to a method and apparatus for pairing half-discs in the replication of DVDs (Digital Versatile Discs, also known in the art as Digital Video Discs) or other optical discs for information storage. By way of introduction, an exemplary process for replicating optical discs will first be described.

FIG. 1 is a flow chart of an exemplary method or process for replicating optical discs consistent with certain embodiments of the present invention. Referring to FIG. 1, following start block 102, the replication process begins with the production of a glass master disc at block 104. The glass master is commonly made by applying a special developer or photo-lacquer to a glass plate. A laser writer is then used to burn the microstructure (the data) of the optical disc onto the developer on the glass master. The glass is then coated with a layer of nickel that assimilates the data structure. The layer of nickel foil is then removed and used as a pattern or mold in the replication process.

The repetitive part of the replication process begins at block 106, where upper and lower clear polycarbonate discs, known as half-discs, are injection molded. In some applications, one of the half discs may have no data structure, while in other applications both half-discs have data patterns. At block 108, the one or two half-discs with data patterns are coated with a reflective material. This may be performed as a sputtering process using aluminum, silicon, gold or silver, for example.

At block 110, a bonding material, typically a liquid or gel, is placed on the upper surface of the lower half-disc and the upper and lower half-discs are brought together or "paired". The bonding material may, for example, be an ultraviolet curable resin, that is, a resin that is cured or set by exposure to ultraviolet (UV) light. The pairing process is described in more detail below. At block 112 the paired half-discs are spun to remove excess bonding material. Finally, at block 114, the bonding material is cured (by exposure to UV light, for example).

At decision block 116, it is determined if more discs are to be replicated. If more discs are to be replicated, as indicated by the positive branch from decision block 116, the replication process may be repeated multiple times from block 106. If no more discs are to be replicated, as indicated by the negative branch from decision block 116, the process finishes at termination block 118.

Thus, in a method consistent with certain embodiments of the present invention, an upper half-disc and a lower half-disc may be bonded to form an optical disc by dispensing an ultraviolet curable resin onto a surface of at least one of the upper half-disc and the lower half-disc, placing the upper half-disc and lower half-disc in a chamber, reducing the pressure within the chamber to a first pressure below an ambient pressure, and then bringing the upper half-disc and the lower half-disc into close proximity within the chamber to distribute the bonding material between the upper surface of the lower half-disc and the lower surface of the upper half-disc and form a paired disc. Next the paired disc is spun to remove excess ultraviolet curable resin and then exposed to ultraviolet light to cure the ultraviolet curable resin and form the optical disc.

Cost-effective optical disc replication calls for a short replication time (high throughput) and a low rate of rejection (high yield). An important part of the replication process described above is the bringing together or pairing of the two half-discs. In a prior pairing process, ultraviolet curable resin is deposited on one of the half-discs and then the two half-discs are brought together with their mating surfaces at an acute angle to each other. The angle between the half-discs is then decreased so that the ultraviolet curable resin is distributed across the mating surfaces of the half-discs. One disadvantage of this approach is the high complexity of the control system that controls the motion of the half-discs. The motion must be specified in advance using a large number of parameters. The complexity of the motion control machinery increases the time spent maintaining and repairing equipment. A further disadvantage of this approach is that bubbles can occur between the mated surfaces of the half-discs. These bubbles are caused by trapped air. The bubbles reflect laser light and can cause the optical disc to be rejected. This reduces the yield of the replication process.

In one embodiment consistent with the present invention two half-discs of an optical disc, such as a DVD, are paired together in a chamber containing air at a reduced pressure. The reduced pressure also provides a reduction in the size and number of bubbles formed between the two half-discs. A half-disc may be moved by action of a pressure-activated flexible diaphragm.

Figure 2:
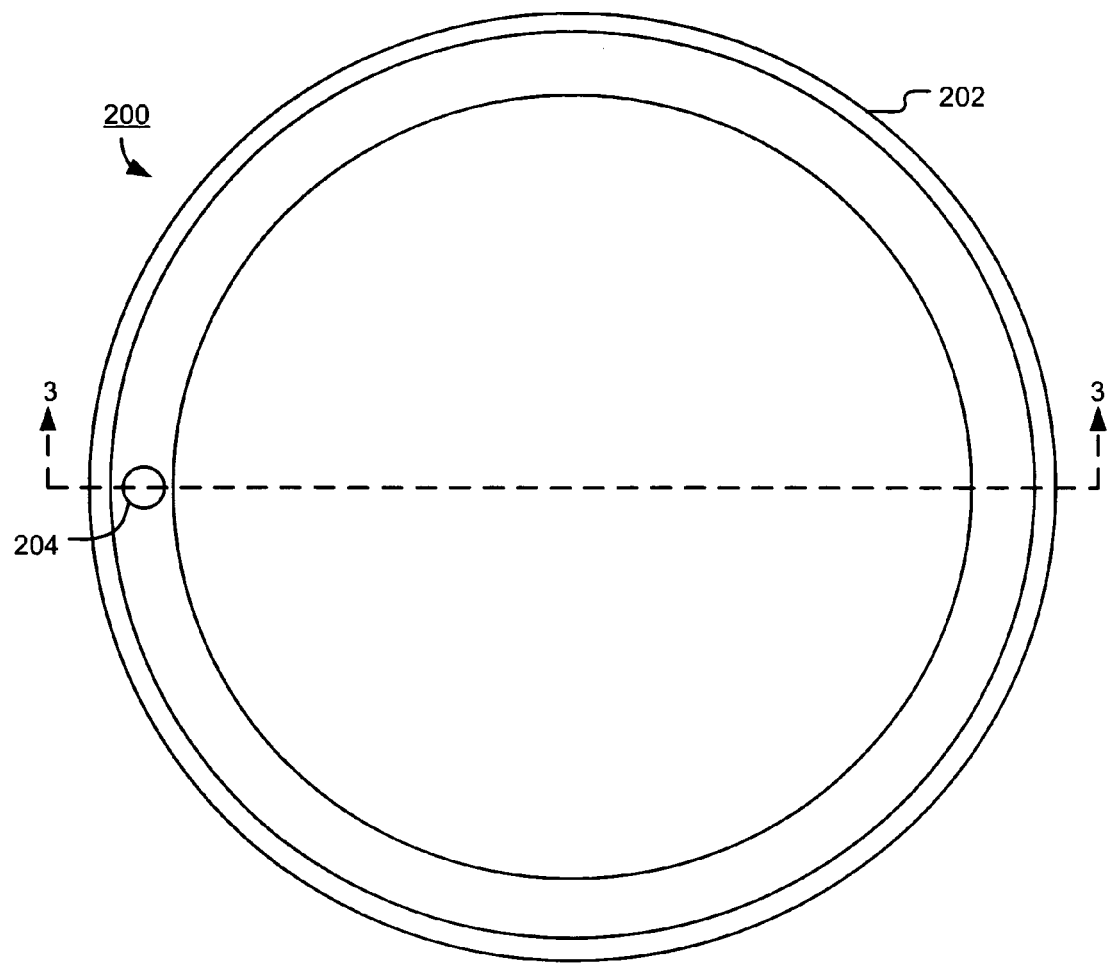
FIG. 2 is a view of an optical disc pairing device consistent with certain embodiments of the present invention.

FIG. 2 is a top view of an exemplary improved optical disc pairing device 200 consistent with certain embodiments of the present invention. In FIG. 2, an upper housing 202 of the optical disc pairing device 200 is shown. A vacuum port 204 passes through the upper housing into a chamber (discussed below with reference to FIG. 3). The section 3-3 is shown in FIG. 3.

Figure 3:
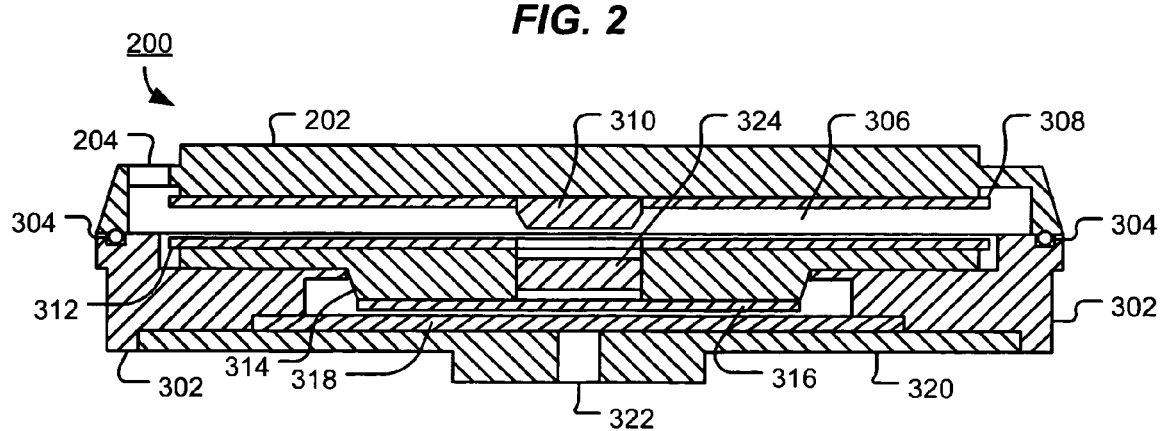
FIG. 3 is a sectional view of an optical disc pairing device consistent with certain embodiments of the present invention.

FIG. 3 is a sectional view of an exemplary optical disc pairing device shown in FIG. 2. Referring to FIG. 3, the upper housing 202 is locatable on a lower housing 302. An O-ring seal 304 is located in either the upper or lower housings and provides an air-tight seal between the upper and lower housings when they are brought together. When the upper and lower housings are brought together, a chamber 306 is formed between them. A partial vacuum may be formed in the chamber 306 by drawing air out of the chamber through chamber vacuum port 204, using a vacuum pump, for example. It will be apparent to those of ordinary skill in the art, upon consideration of the present teachings, that the chamber vacuum port 204 may alternatively be positioned in the lower housing 302. An upper half-disc 308 is held onto the lower surface of the upper housing 202, using suction for example. The upper half-disc 308 is aligned using a center pin 310.

A lower half-disc 312 is positioned on the upper surface of a pair plate 314. The pair plate 314 is supported by the lower housing 302. Optionally, a space plate 316 is attached to the lower surface of the pair plate 314. Beneath the pair plate 314 and spacer plate 316 is a flexible diaphragm 318. The flexible diaphragm 318 may be made of rubber, such as neoprene, or other material. The perimeter of the flexible diaphragm 318 is held in place by a base plate 320. A diaphragm vacuum port 322 is located in the base plate 320 and may be used to reduce the pressure under the flexible diaphragm 318. A stop pin 324 is mounted in the pair plate 314. The pair plate may be raised by motion of the flexible diaphragm 318 until the stop pin contacts the center pin 310. This mechanism controls the minimum spacing between the two half-discs 308 and 312.

The operation of an exemplary pairing device consistent with certain embodiments of the present invention will now be described with reference to FIGS. 4-7.

Figure 4:
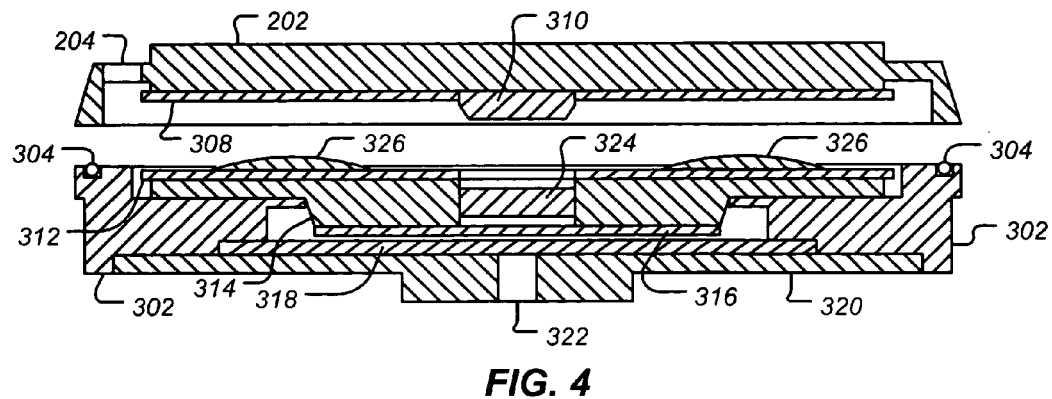
FIG. 4 is a sectional view of an optical disc pairing device prior to pairing consistent with certain embodiments of the present invention.

FIG. 4 is a sectional view of an exemplary optical disc pairing device prior to pairing. Referring to FIG. 4, the upper half-disc 308 has is located in the upper housing 202, and the lower half-disc 312 is located on the pair plate 314 in the lower housing 312. Bonding material 326, such as an ultraviolet curable resin, has been deposited on the upper surface of the lower half-disc 312. The upper housing 202 and lower housing 302 are displaced from each other to allow the half-discs to be loaded and the bonding material to be deposited. The half-discs may be held in place by suction.

Figure 5:
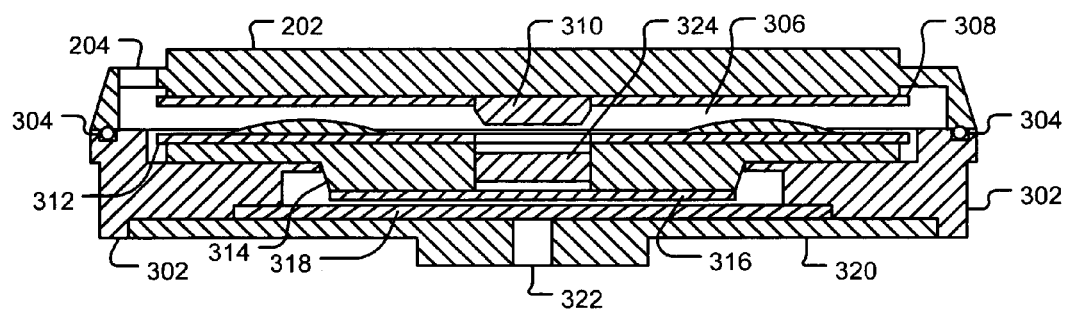
FIG. 5 is a further sectional view of an optical disc pairing device prior to pairing consistent with certain embodiments of the present invention.

FIG. 5 is a further sectional view of the example optical disc pairing device prior to pairing. Referring to FIG. 5, the upper housing 202 and the lower housing 302 are brought together such that the peripheries of the housings make contact with an o-ring seal 304 to form an air tight chamber 306 between the housings. The pressure in the chamber 306 is reduced by applying a vacuum head to the chamber vacuum port 204. Suction is also applied to the diaphragm vacuum port 322. The suction applied to the diaphragm vacuum port 322 is greater than or equal to the suction applied to the chamber vacuum port 204 so as to prevent the diaphragm from flexing upwards. In one embodiment consistent with the invention, the suction applied to the chamber 306 is −80 kPa, while the suction applied at the diaphragm port 322 is −85 kPa.

Figure 6:
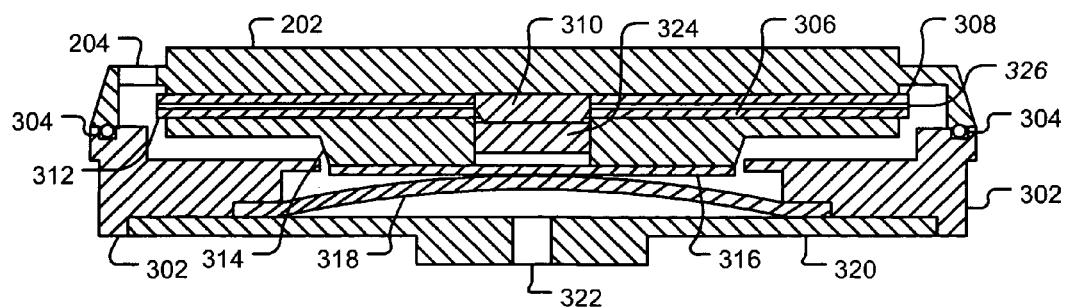
FIG. 6 is a sectional view of an optical disc pairing device during pairing consistent with certain embodiments of the present invention.

FIG. 6 is a sectional view of an example optical disc pairing device during pairing. Once a partial vacuum has been formed in the chamber 306, the suction applied to the diaphragm vacuum port 322 is reduced. In one embodiment consistent with the invention, the suction applied at the diaphragm port 322 is reduced to −35 kPa. This creates a pressure differential across the flexible diaphragm 318 that causes the diaphragm to flex upwards as shown in FIG. 6. The upward flexure of the diaphragm displaces the pair plate 314 upwards. Upward motion of the pair plate 314 is halted when the stop pin 324 comes into contact with the center pin 310. The pair plate 314 and the stop pin 324 are configured such that when they come into contact with each other there is a small separation between the upper half-disc 308 and the lower half-disc 312. The bonding material 326 is distributed throughout the space between the two half-discs.

Figure 7:
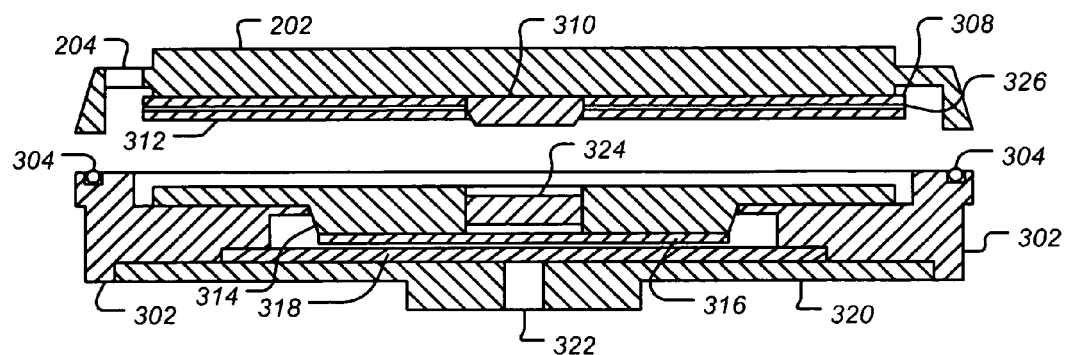
FIG. 7 is a sectional view of an optical disc pairing device after pairing consistent with certain embodiments of the present invention.

FIG. 7 is a sectional view of an exemplary optical disc pairing device after pairing consistent with certain embodiments of the present invention. After the upward flexure of the flexible diaphragm 318 the chamber vacuum port 204 is opened to atmospheric pressure. The resulting pressure difference across the diaphragm 318 pulls the diaphragm down, allowing the pair plate 314 to fall back down as shown in FIG. 7. The lower half-disc 312 is held in place by surface tension in the layer of bonding material 326 between the upper half-disc 308 and the lower half-disc 312.

One advantage of certain embodiments consistent with the pairing process, described above with reference to FIGS. 4-7, is that the two half-discs are brought together in a reduced pressure environment. This reduces the tendency for air bubbles to be trapped between the two half-discs, thereby increasing the yield of the replication process. A further advantage is that the two half-discs may be paired more rapidly, thereby increasing the throughput of the replication process. An exemplary embodiment consistent with the invention provided a 5% decrease in replication time. This improvement translates into approximately 1200 additional discs per day from the pairing device with improved yields, compared with the prior process.

Thus, consistent with certain embodiments of the present invention, an apparatus for bonding an upper half-disc and a lower half-disc to form an optical disc comprises an upper housing, for holding the upper half-disc, a lower housing, for supporting the lower half-disc. The lower housing contacts the upper housing to form an air-tight chamber between the upper housing and the lower housing. The apparatus also includes an actuator for pairing the upper half-disc and the lower half disc by bringing the upper half-disc and the lower half disc into close proximity within the air-tight chamber while pressure in the air-tight chamber is held below ambient air pressure. Bringing the upper half-disc and the lower half disc into close proximity distributes a bonding material between the upper half-disc and the lower half-disc to fill the space between the upper half-disc and the lower half-disc.

The half-disc need not be oriented horizontally, thus an apparatus, consistent with certain embodiments of the present invention, for bonding an first half-disc and a second half-disc to form an optical disc comprises a means for dispensing a bonding material onto a surface of at least one of the first half-disc and the second half disc, a means for forming an air-tight. chamber around the first and second half-discs, a means for reducing the pressure in the air-tight chamber to a first pressure below an ambient pressure, and an actuator means for bringing the first half-disc and the second half disc into close proximity of each other within the air-tight chamber. The action of bringing the first half-disc and the second half disc into close proximity of each other distributes the bonding material between the first half-disc and the second half-disc.

Figure 8:
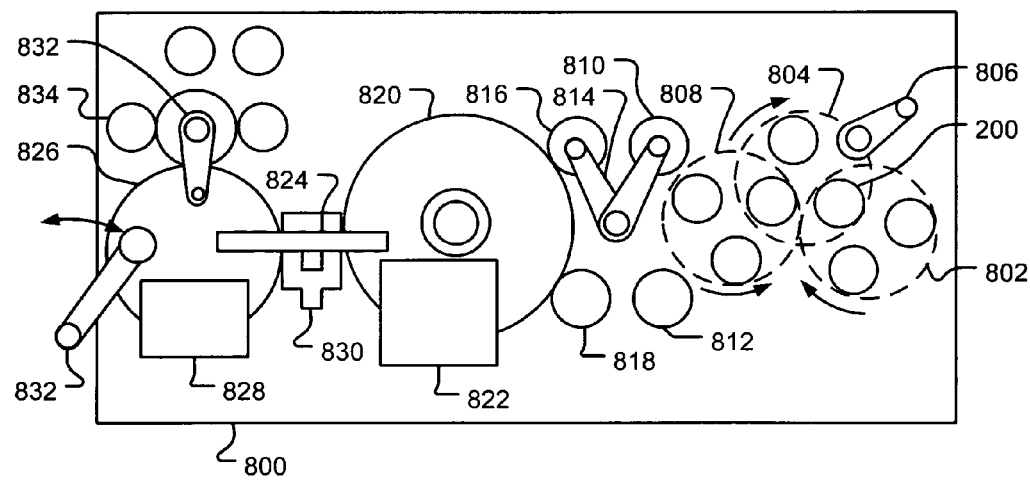
FIG. 8 is a bonding machine consistent with certain embodiments of the present invention.

FIG. 8 shows an example of a bonding machine consistent with certain embodiments of the present invention. Referring to FIG. 8, the bonding machine 800 receives upper and lower half-discs from a sputtering machine via a sputter transfer unit. The lower half discs are transferred to a dispense table 802, where they are loaded into the lower housing of the pairing device 200 and bonding material is dispensed onto the surface of the half-disc. The upper half-discs are transferred from the sputter transfer unit to an accept table 804 where they are loaded into the upper housing of the pairing device 200. Since the accept table 804 is higher than the dispense table 803 in this embodiment, a pop-up arm 806 may be used to transfer discs to the accept table 804. The paired discs are transferred to a transfer table 808, from where they are moved to a first spinner 810 or second spinner 812 using distribution arm 814. The spinners spin the discs rapidly to remove excess bonding material from the paired discs. Next, the paired discs are moved to a first spot UV unit 816 or a second spot UV unit 818, where the paired discs are exposed to an initial burst of UV light to initiate the curing process for the bonding material. The paired discs are then moved to a rotating UV table 820 where they passed under a UV lamp 822. This completes the assembly of the replicated optical disc discs.

The completed discs may be transferred by transfer arm 824 to an inspection table 826 where they are passed under a visual checker 828 to identify faults in the assembled discs. A visual checker turnover arm 830 is used to turn the discs over so that both sides of the discs can be examined by the visual checker. Faulty discs may be removed by a visual checker take-out arm 832 and placed on a spindle table 834. The remaining discs are removed from the visual checker table 826 by robot arm 832, and then passed to the next stage of the process, which may be a stacking unit for example.

The dispense table 802, accept table 804 and transfer table 808 are rotated together as indicated by the arrows in the figure, so that loading, pairing and transfer can be performed in parallel.

The above is a description of exemplary embodiments of the invention. However, the invention is not limited to such exemplary embodiments, since other embodiments could be implemented using equivalent components.

Figure 9:
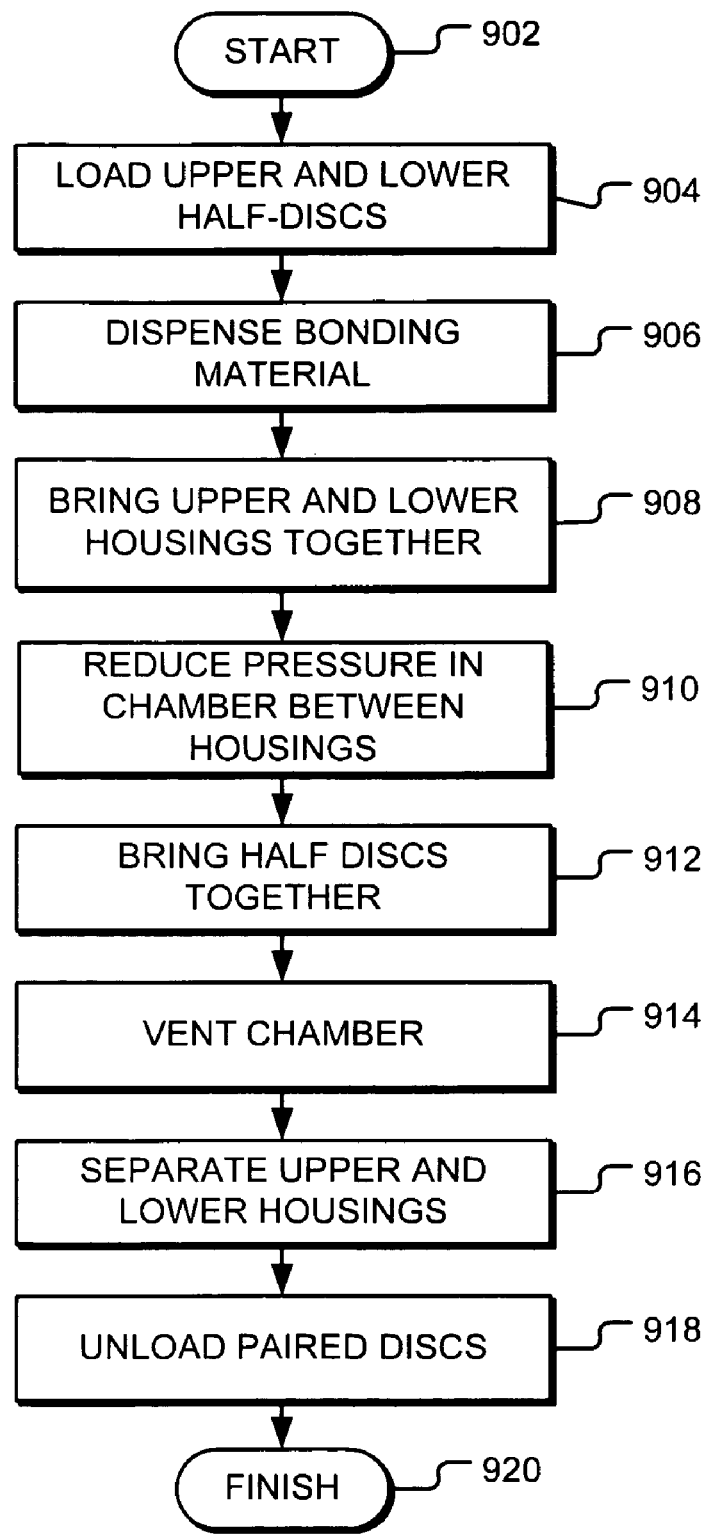
FIG. 9 is a flow chart of a method for pairing optical discs consistent with certain embodiments of the present invention.

FIG. 9 is a flow chart of an example method for pairing optical discs consistent with certain embodiments of the present invention. Following start block 902, upper and lower half-discs are loaded into upper and lower housings respectively at block 904. At block 906 a bonding material, such as a UV curable resin, is dispensed onto the upper surface of the lower half-disc. At block 908, the upper and lower housings are brought together, by action of a robotic arm for example, to form an air-tight chamber between the two housings. The upper and lower half-discs are located within this chamber. The pressure in the chamber is reduced at block 910. This may be achieved by applying suction to the chamber, as described above, or by increasing the volume of the chamber.

At block 912, the upper and lower discs are brought together, causing the bonding material to be distributed across the interface between the upper and lower half-discs. The half-discs may be brought together by moving one or both of the discs. In the embodiment described above, the lower disc is raised by action of a pressure activated flexible diaphragm acting on a pair plate that supports the half-disc. However, other actuators may be used, such as electromechanical, hydraulic, piezoelectric or pneumatic actuators etc. For example, rather than use the flexible diaphragm, the pair plate may be connected at its periphery to the lower housing using a flexible air-seal. A pressure difference across the pair plate may then be used to move the pair plate. At block 914, the chamber is vented to the ambient pressure, enabling the upper and lower housings to be separated at block 916. The paired discs are unloaded at block 918 and may be transferred to spinning and curing units. The process is completed at termination block 920.

Figure 10:
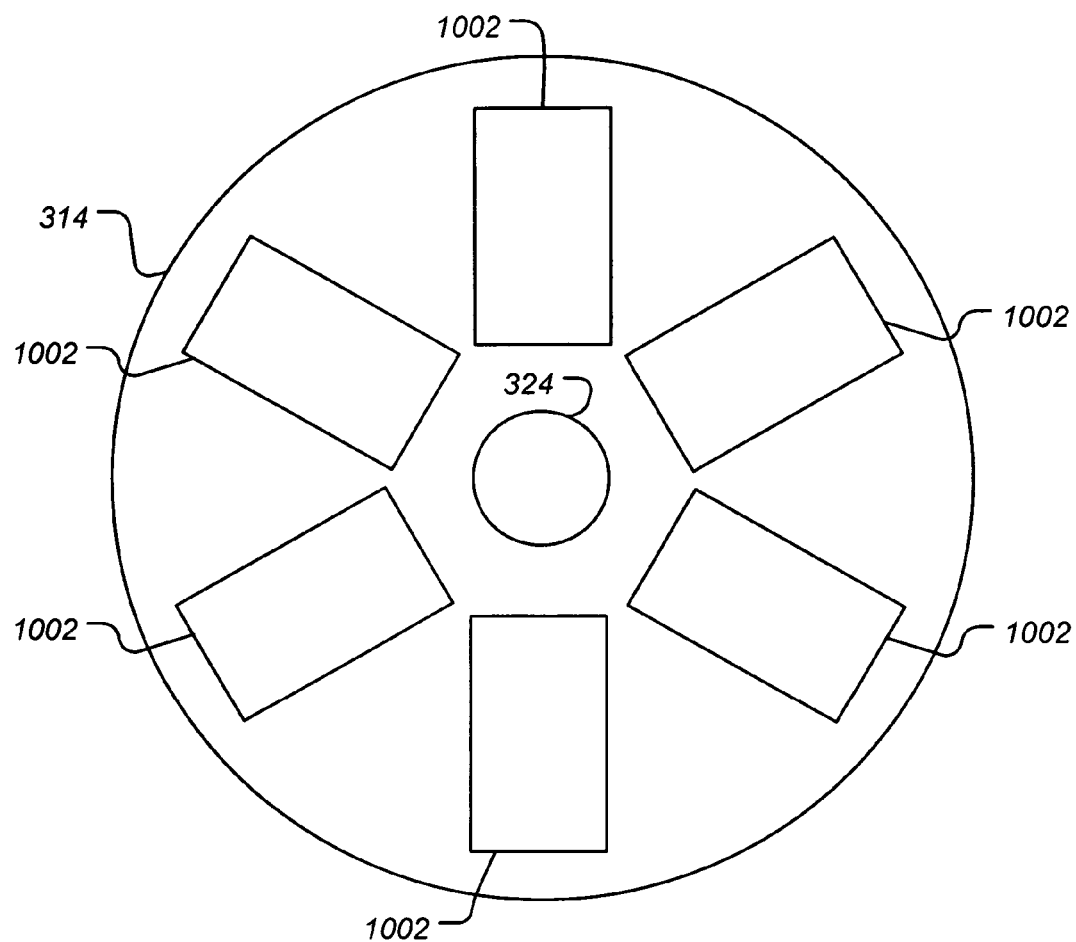
FIG. 10 is a view of a pair plate consistent with certain embodiments of the present invention.

FIG. 10 is a view of an example embodiment of pair plate 314 consistent with certain embodiments of the present invention. FIG. 10 shows the stop pin 324 and the surface of the pair plate 314 that support a half-disc. In this embodiment, strips of tape 1002 are adhered to the surface of the pair plate 314 to create raised regions upon with the half-disc is supported. For example, the tape may be Teflon tape having a thickness of 0.1 mm. These raised regions break the surface tension bond between the half-disc and the pair plate and facilitate separation of the pair plate and the half-disc after pairing has been taken place. Tape strips may also be applied to the surface of the upper housing that holds the upper half-disc.

Thus, consistent with certain embodiments of the present invention, an upper half-disc and a lower half-disc of an optical disc may be paired by loading the upper half-disc into an upper housing, loading the lower half-disc into a lower housing, dispensing a bonding material onto a surface of at least one of the lower half-disc and the upper half-disc and then bringing the upper housing and the lower housing together to form a chamber between the upper housing and the lower housing. The pressure within the chamber is then reduced to a first pressure below an ambient pressure and the upper half-disc and the lower half-disc are brought into close proximity within the chamber to distribute the bonding material between the upper surface of the lower half-disc and the lower surface of the upper half-disc and form a paired disc.

The half-disc need not be orientated horizontally. Thus, consistent with certain embodiments of the present invention, a first half-disc and a second half-disc of an optical disc may be paired by loading the first half-disc into a first housing, loading the second half-disc into a second housing, dispensing a bonding material onto a surface of at least one of the first half-disc and the second half-disc, and bringing the first housing and the second housing together to form a chamber between the first housing and the second housing. The pressure within the chamber is then reduced to a first pressure below an ambient pressure, and the first half-disc and the second half-disc are brought into close proximity within the chamber to distribute the bonding material between a surface of the first half-disc and a surface of the second half-disc and form a paired disc.

Thus, consistent with certain embodiments of the present invention, the optical disc comprises a first half-disc, a second half-disc, and a layer of bonding material distributed between the first half-disc and the second half-disc by depositing the bonding material on the first half-disc, placing the first half-disc and second half-disc in a chamber, reducing the pressure within the chamber to a first pressure below an ambient pressure; and bringing the first half-disc and the second half-disc into close proximity within the chamber.

The pairing process may be part of a bonding process or part of a complete optical disc replication process. The bonding process may be controlled by a programmed logic unit or a computer, for example. Moreover, although an ultraviolet curable bonding material was used in the exemplary embodiments, any suitable bonding material or adhesive could also be used without departing from embodiments consistent with the present invention.

Those skilled in the art will appreciate, upon consideration of the present teaching, that the processes described above can be implemented in any number of variations without departing from embodiments of the present invention. For example, the order of certain operations carried out can often be varied, additional operations can be added or operations can be deleted without departing from certain embodiments of the invention. Such variations are contemplated and considered equivalent.

Those skilled in the art will also appreciate, upon consideration of the present teaching, that the apparatus described above can be implemented in any number of variations without departing from embodiments of the present invention. For example, various components may be added, removed or exchanged for equivalents whilst retaining the functionality of the apparatus. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method for pairing an upper half-disc and a lower half-disc of an optical disc, the method comprising:
   loading the upper half-disc into an upper housing;
   loading the lower half-disc into a lower housing;
   dispensing a bonding material onto a surface of at least one of the lower half-disc and the upper half-disc;
   bringing the upper housing and the lower housing together to form a chamber between the upper housing and the lower housing,
   reducing the pressure within the chamber to a first pressure below an ambient pressure; and
   bringing the upper half-disc and the lower half-disc into close proximity within the chamber to distribute the bonding material between the upper surface of the lower half-disc and the lower surface of the upper half-disc and form a paired disc,
   wherein the lower half-disc is supported on a pair plate in the lower housing and wherein bringing the upper half-disc and the lower half-disc into close proximity within the chamber comprises increasing a pressure below a flexible diaphragm in the lower housing from a second pressure to a pressure greater than the pressure in the chamber, causing the flexible diaphragm to flex upwards and displace the pair plate upwards.

2. A method in accordance with claim 1, further comprising:
   increasing the pressure within the chamber from the first pressure to the ambient pressure; and
   removing the paired disc from the chamber.

3. A method in accordance with claim 1, wherein the second pressure below the flexible diaphragm is less than the first pressure in the chamber.

4. A method in accordance with claim 1, wherein reducing the pressure within the chamber to the first pressure below the ambient pressure comprises applying suction to a vacuum port in the chamber.

5. A method for pairing a first half-disc and a second half-disc of an optical disc, the method comprising:
   loading the first half-disc into a first housing;
   loading the second half-disc into a second housing;
   dispensing a bonding material onto a surface of at least one of the first half-disc and the second half-disc;
   bringing the first housing and the second housing together to form a chamber between the first housing and the second housing, reducing the pressure within the chamber to a first pressure below an ambient pressure; and bringing the first half-disc and the second half-disc into close proximity within the chamber to distribute the bonding material between a surface of the first half-disc and a surface of the second half-disc and form a paired disc, wherein the second half-disc is supported on a pair plate in the second housing and wherein bringing the first half-disc and the second half-disc into close proximity within the chamber comprises increasing a pressure below a flexible diaphragm in the second housing from a second pressure to a pressure greater than the pressure in the chamber, causing the flexible diaphragm to flex upwards and displace the pair plate upwards.

6. A method in accordance with claim 5, further comprising:

increasing the pressure within the chamber from the first pressure to the ambient pressure; and removing the paired disc from the chamber.

7. A method in accordance with claim 5, wherein the second pressure below the flexible diaphragm is less than the first pressure in the chamber.

8. A method in accordance with claim 5, wherein reducing the pressure within the chamber to the first pressure below the ambient pressure comprises applying suction to a vacuum port in the chamber.

9. A method for bonding an upper half-disc and a lower half-disc to form an optical disc, the method comprising:

dispensing an ultraviolet curable resin onto a surface of at least one of the upper half-disc and the lower half-disc;

placing the upper half-disc and lower half-disc in a chamber;

reducing the pressure within the chamber to a first pressure below an ambient pressure;

bringing the upper half-disc and the lower half-disc into close proximity within the chamber to distribute the bonding material between the upper surface of the lower half-disc and the lower surface of the upper half-disc and form a paired disc;

spinning the paired disc to remove excess ultraviolet curable resin; and exposing the paired disc to ultraviolet light to cure the ultraviolet curable resin and form the optical discs, wherein the lower half-disc is supported on a pair plate in the chamber and wherein bringing the upper half-disc and the lower half-disc into close proximity within the chamber comprises increasing a pressure below a flexible diaphragm in the chamber from a second pressure to a pressure greater than the pressure in the chamber, causing the flexible diaphragm to flex upwards and displace the pair plate upwards.

10. A method in accordance with claim 9, further comprising:

checking the optical disc for defects; and discarding the optical disc if a defect is found.

11. A method in accordance with claim 9, wherein placing the upper half-disc and lower half-disc in the chamber comprises:

loading the upper half-disc into an upper housing;

loading the lower half-disc into a lower housing; and bringing the upper housing and the lower housing together to form the chamber between the upper housing and the lower housing.

* * * * *